Feb. 26, 1963  D. E. SHARP ETAL  3,078,692
PROCESS AND APPARATUS FOR FORMING MULTIPLE
SHEET GLAZING UNITS
Filed May 12, 1958  4 Sheets-Sheet 1

INVENTORS
Eldwin C. Montgomery, Harry N. Dean,
Eugene W. Babcock
BY and Donald E. Sharp
Nobbe & Swope
ATTORNEYS Feb. 26, 1963
D. E. SHARP ETAL
PROCESS AND APPARATUS FOR FORMING MULTIPLE
SHEET GLAZING UNITS
Filed May 12, 1958

INVENTORS
Eldwin C. Montgomery, Harry N. Dean,
Eugene W. Babcock
and Donald E. Sharp
BY
Nobbe & Swope
ATTORNEYS Feb. 26, 1963　　D. E. SHARP ETAL　　3,078,692
PROCESS AND APPARATUS FOR FORMING MULTIPLE
SHEET GLAZING UNITS
Filed May 12, 1958　　　　　　　　　　4 Sheets-Sheet 3

INVENTORS
Eldwin C. Montgomery, Harry N. Dean,
Eugene W. Babcock
and Donald E. Sharp
BY Nobbe & Swope
ATTORNEYS Feb. 26, 1963 D. E. SHARP ETAL 3,078,692
PROCESS AND APPARATUS FOR FORMING MULTIPLE
SHEET GLAZING UNITS
Filed May 12, 1958 4 Sheets-Sheet 4

INVENTORS
Eldwin C. Montgomery, Harry N. Dean,
BY Eugene W. Babcock
and Donald E. Sharp
Tobbe & Swope
ATTORNEYS

United States Patent Office 3,078,692
Patented Feb. 26, 1963

3,078,692
PROCESS AND APPARATUS FOR FORMING MULTIPLE SHEET GLAZING UNITS
Donald E. Sharp, deceased, late of Maumee, Ohio, by Ohio Citizens Trust Co., executor, Toledo, Ohio, Harry N. Dean, Waterville, and Eugene W. Babcock, Perrysburg, Ohio, and Eldwin C. Montgomery, Shreveport, La., assignors to Libbey-Owens-Ford Glass Company, Toledo, Ohio, a corporation of Ohio
Filed May 12, 1958, Ser. No. 735,094
9 Claims. (Cl. 65—55)

This invention relates broadly to all-glass, multiple sheet glazing units. More particularly, it relates to an apparatus and method for sealing together the peripheral edge portions of spaced sheets of glass to produce a hermetically sealed glazing unit, the sides of which are formed by the union of said edge portions.

This application is a continuation-in-part of the copending application of Eldwin C. Montgomery, Harry N. Dean, Eugene W. Babcock and Donald E. Sharp, Serial No. 464,012, filed October 22, 1954, now abandoned.

Multiple sheet glazing units may be described generally as comprising two or more sheets of glass which are sealed entirely around their edge portions in spaced relation to provide a hermetically sealed dead-air space therebetween. Due principally to their insulating and condensation preventing qualities, such units have become well established in the building trades and have found wide usage as windows for buildings, show cases, vehicles, refrigerators, and the like.

In the early development of the multiple sheet glazing art, it was customary to seal together the edge portions of spaced sheets of glass by means of strips of a substantially impervious material which were placed between said portions and bonded thereto in any suitable manner. In many cases, the seal so produced was found not to be hermetic and the unit thus impractical for the purposes of improved insulation and the prevention of condensation. As well, in other instances, the sealing process was found to be so cumbersome and expensive the production on a mass basis was practically impossible.

Later developments in the glazing art produced all-glass units which instead of using separator strips had their edge portions fused together to provide a fused edge wall which acted as a separating means maintaining the sheets in spaced relation. These units were conventionally manufactured by maintaining the sheets in a substantially horizontal position while moving them through a furnace and applying concentrated heat to the edge portions thereof to cause the edge portions of the upper sheet to sag downwardly and become fused with the edge portions of the lower sheet.

The horizontal methods of producing all-glass glazing units are accompanied by many difficulties inherently associated with the horizontal positioning of the glass sheets. For example, in order to prevent thermal shock during the fusing of the edges the entire sheets are maintained at an elevated temperature which it has been found causes unsupported sections of these sheets to sag appreciably. This sagging not only causes a finished unit to be optically unsatisfactory, but also tends to produce an improperly sealed unit.

An even more serious situation frequently encountered in the horizontal positioning of the glass sheets during fusing is a tendency for the fused edge walls to have re-entrant angles rather than uniformly curved inner surfaces. This is inherent in the fact that when the edge portions of the sheets are heated to the point at which they are soft the weight of the glass acting perpendicularly to the plane of the surface of the glass causes the fused edge formed to have internal or re-entrant angles. It has been found that because of the greater stress concentration along the re-entrant angles that they have been a frequent source of breakage in units of this type.

It was to overcome these various difficulties which have been encountered in conventional horizontal processes of making all-glass units that applicants conceived of the novel method of the present invention.

A principal object of this invention therefore is to provide an improved all-glass, multiple sheet glazing unit which is hermetically sealed.

Another object of this invention is to provide a relatively simple and inexpensive method of forming hermetically sealed, multiple sheet glazing units.

Another object of the invention is to produce an all-glass glazing unit having a sealed peripheral edge wall which is uniform in appearance along its outer surface and has a substantially uniform inner radius of seal.

Still another object of this invention is to provide a novel method for sealing together the edge portions of spaced sheets of glass to form a hermetically sealed space therebetween.

A further object of the invention is to provide a novel apparatus by means of which all-glass glazing units of various sizes may be produced.

A still further object of this invention is to provide novel apparatus by means of which all-glass, multiple sheet glazing units may be produced in mass production fashion.

Other objects and advantages of the invention will become more apparent during the course of the following description when taken in connection with the accompanying drawings.

In the drawings, wherein like numerals are employed to designate like parts throughout the same.

Briefly stated, the present invention contemplates the production of improved hermetically sealed glazing units made entirely of glass by means of a method and apparatus which supports two or more sheets of glass in vertical fixed spaced relation and moves said sheets past concentrated heat sources so that the peripheral edge portions of the glass sheets may be united to thereby seal off a dead air space between said sheets. That is, according to the invention, concentrated heat sources are directed upon each pair of edge portions of the moving spaced glass sheets to cause said edge portions to become softened so that they may be bent into fusing contact with one another.

It should be noted particularly that the positioning of the glass sheets in a vertical manner according to the invention is especially beneficial as regards overcoming the difficulties experienced in the prior art horizontal methods discussed hereinabove. As one instance, when the softened marginal edge portions of a pair of vertically disposed glass sheets are brought together into fusion contact the weight of the glass acting downwardly in the plane of the sheets causes the inner surface of a lower forming edge wall to assume a substantially uniformly curved condition rather than having the relatively sharp re-entrant angles frequently encountered in units produced by horizontal methods. Also, since these internal angles have been shown to promote breakage in the marginal regions, it is clear that elimination of such angles removes this source of breakage and accordingly improves the quality of the unit.

Additionally, maintaining the sheets vertically during the fusing of the edge portions keeps the glass weight force component in the plane of the sheets so that even at relatively high temperatures the sheets will maintain their original substantially flat and parallel condition. This prevention of sagging or deforming of the viewing areas of the sheets composing the unit is of primary importance in producing finished units of superior viewing properties. It is apparent that in the manufacture of windows or windshields the viewing areas of such units must be of high optical quality and permit an object to be viewed therethrough relatively free from distortion.

A further advantageous feature of the invention is that of supporting the glass sheets which are to be fused into a glazing unit by engaging surfaces other than the opposing adjacent face surfaces. In certain prior art methods of producing such glazing units, sheets which are to have their edges or marginal edge portions sealed were maintained separated by strips of material, structure, or spacing members which contact the sheets at certain specified areas of the opposing face portions. The necessity for removing these separating strips or structure during the sealing of the edge portions of the glass is a problem which causes a great detail of difficulty in these methods. Now, however, in practicing the invention the sheets are maintained substantially free from special members between the glass sheets or in contact with the opposed surfaces of the glass sheets.

Figures 1, 2, 3, 4, 5:
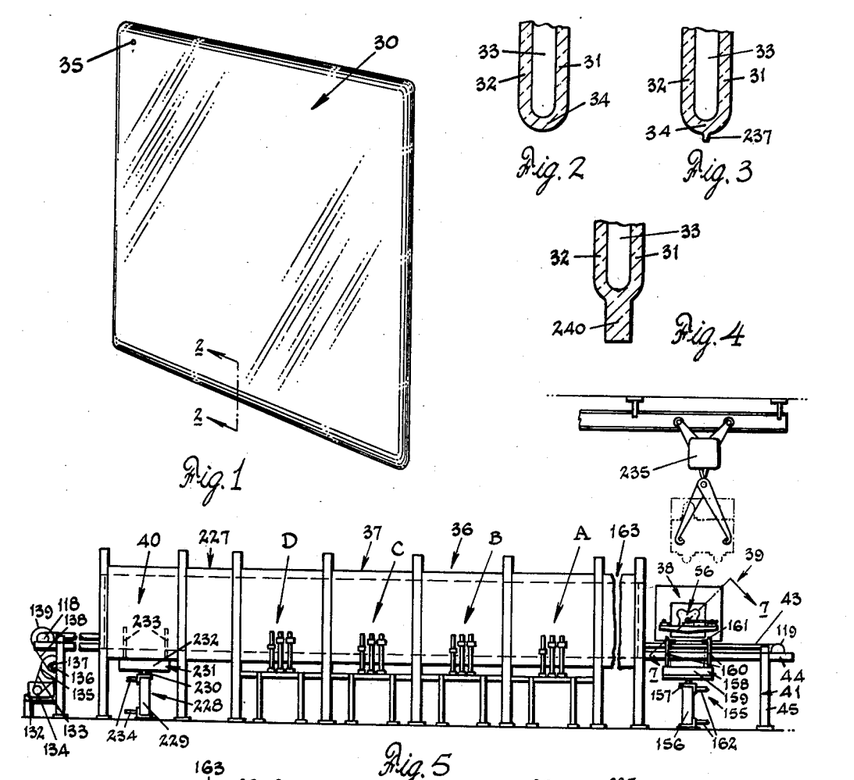
FIG. 1 is a perspective view of an all-glass multiple sheet glazing unit produced in accordance with this invention.
FIG. 2 is a sectional view of the glazing unit taken substantially along line 2—2 of FIG. 1.
FIG. 3 is a sectional view of an all-glass glazing unit having a differently shaped peripheral edge wall.
FIG. 4 is a sectional view of an all-glass glazing unit illustrating another type of edge wall that may be formed by the apparatus of the invention.
FIG. 5 is a fragmentary rear elevation of an apparatus for producing the glazing unit showing the furnace, conveyor and burners.

Referring now to the drawings, there is shown in FIGS. 1 and 2 an all-glass, multiple sheet glazing unit 30 produced in accordance with this invention which comprises two sheets of glass 31 and 32 spaced from one another as at 33 by edge wall portions 34. Disposed inwardly of a corner of one sheet of the unit is a dehydration hole 35 (FIG. 1) which has been hermetically sealed to seal the enclosed space 33.

Figures 6, 7:
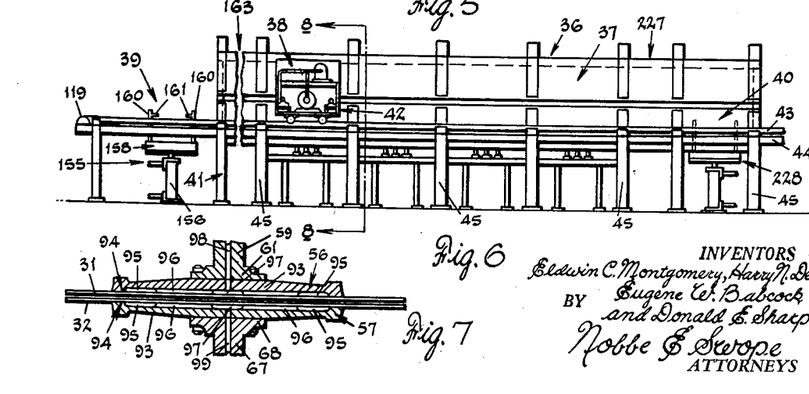
FIG. 6 is a fragmentary front elevation of the apparatus shown in FIG. 5.
FIG. 7 is a sectional view of the vacuum platens and spaced sheets of glass supported thereby taken substantially along lines 7—7 of FIG. 6.

As will be seen in FIGS. 5 and 6, the apparatus by means of which all-glass multiple sheet glazing units 30 may be produced is designated generally by the numeral 36 and includes a furnace 37 and a conveyor and handling means 38 arranged adjacent said furnace and mounted for movement relative thereto. Within the furnace there are arranged between the loading station 39 and the unloading station 40 thereof a first sealing area A, a second sealing area B, a third sealing area C, and a fourth sealing area D.

Figures 9, 11, 12:
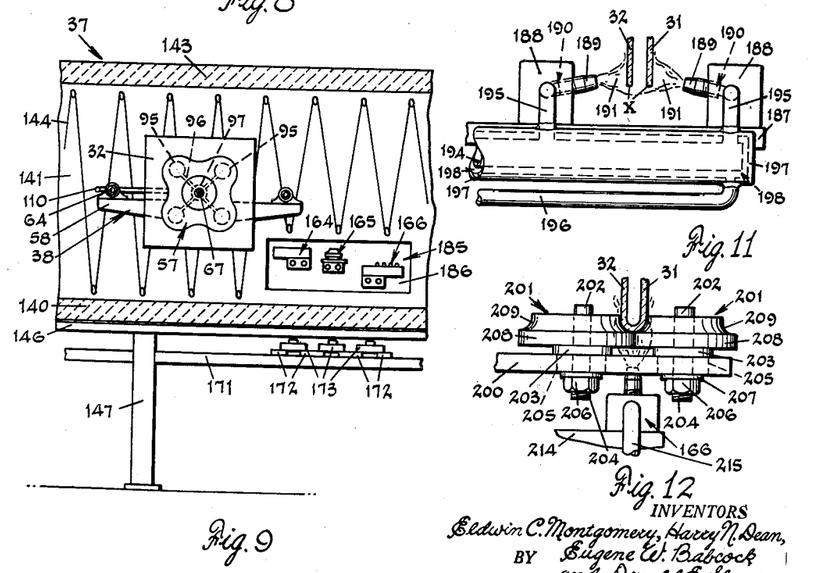
FIG. 9 is a fragmentary sectional view taken substantially along lines 9—9 of FIG. 8.
FIG. 11 is a transverse side view of one of the fusing burners showing the relation of the nozzles of the burners with respect to sheets of glass passing therebetween.
FIG. 12 is a side view of a forming tool of the invention showing its shaping action on the edge of an all-glass glazing unit.

As previously mentioned, and as will be more fully described hereinafter, the all-glass unit 30 is produced by assembling the two sheets of glass 31 and 32 in fixed spaced relation in a substantially vertical position as shown in FIGS. 7 and 9, and continuously moving them in a predetermined path while so supported past concentrated heat sources located in the sealing areas A, B, C and D to cause the edge portions of the sheets to progressively soften and reach fusion temperature after the sheet edges reach the proper temperature and while moving in their predetermined path the edges $x$ (FIG. 18) or marginal face areas $y$ of said edge portions are brought into contact with one another so that they will become sealed together. In other words, the term "edge portions" as used herein and in the claims includes the edges $x$ and/or the marginal face areas $y$ of the sheets.

In being moved through the sealing areas mentioned above, the sheets 31 and 32 are supported in the vertical position and carried by the conveyor 38 which includes generally a rail support frame 41 and a carriage 42 adapted to ride on rails 43 on said support. More particularly, as will best be seen in FIGS. 6 and 8, the rail support 41 is formed of a pair of longitudinally extending horizontally disposed channels 44 secured to the upper ends of upright channels 45, and a second pair of horizontally disposed channels 46 secured to the said uprights 45 intermediate their length. Transverse horizontal cross arms 47 extend between the upper horizontal channels 44 and the uprights 45 to lend rigidity to the support, while additional transverse cross-arms 48 extend between the lower horizontal channels 46.

The rails 43 are formed of solid rolled steel stock and are secured in position on blocks 49 having notches 50 therein mounted on the cross-arms 47. The rails 43 and support 41 extend beyond each end of the furnace so that the carriage 42 may completely clear the furnace when it is desired to re-position the carriage for another cycle of operation as will be described hereinbelow.

Figure 13:
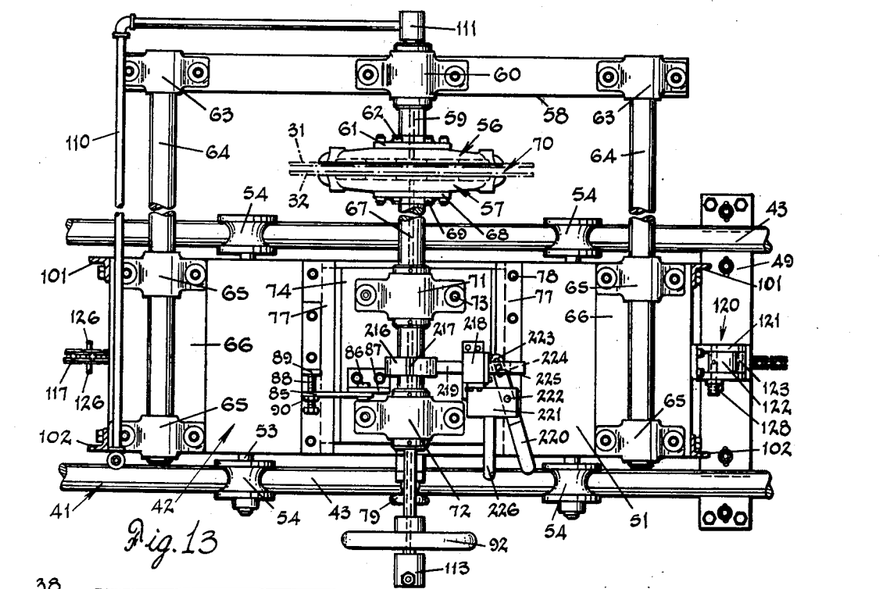
FIG. 13 is a fragmentary top plan view of the conveyor carriage of the apparatus.
Figure 14:
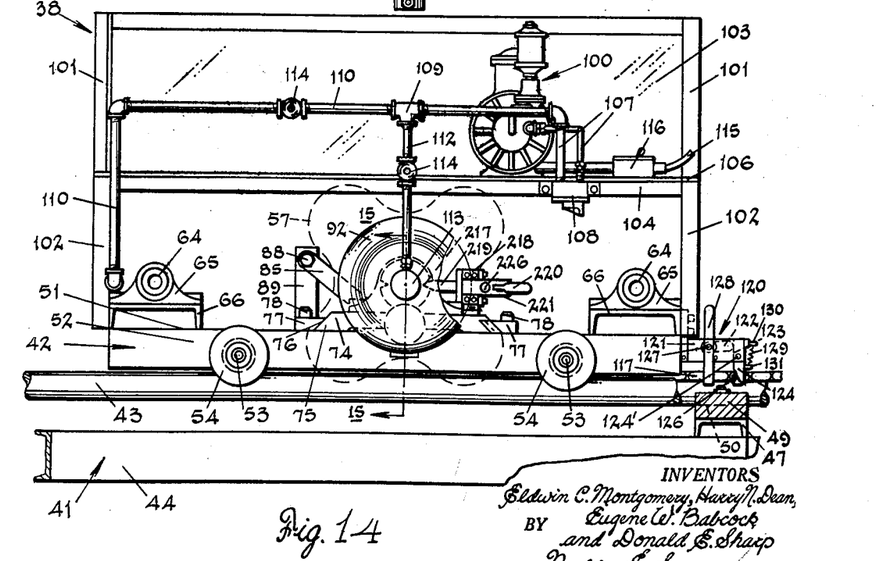
FIG. 14 is a side elevation of the carriage.

Carriage 42, which is adapted to carry the sheets 31 and 32 through the furnace, includes a substantially rectangular base 51 (FIG. 13) having down-turned flanged side portions 52 (FIG. 14). The base 51 is supported on axles 53 which carry grooved wheels 54 at their ends, cut to substantially the curvature of the rails 43 so as to accurately guide the carriage as it moves the sheets through the furnace. The axles 53 are journaled in bearings 55 (FIG. 8) secured to the underside of the said base and extend through suitable holes in the flanged side portions 52.

To support the sheets 31 and 32 in a substantially vertical and spaced position with respect to one another as they are moved through the furnace by the carriage 42, there are provided vacuum platens 56 and 57 on said carriage. Specifically, the vacuum platen 56 is mounted substantially midway between the ends of a cross-arm 58 by means of a stub shaft 59 which is rotatably mounted adjacent one end in a bearing 60 on the said cross-arm 58, and on its other end has a hub 61 to which the said platen 56 is secured by means of bolts 62. Cross arm 58 is supported by means of pillow blocks 63 between the ends of a pair of spaced support rods 64, the support rods being secured by means of pillow blocks 65 to inverted channels 66 mounted along the transverse ends of the carriage base 51.

Vacuum platen 57 is mounted on one end of a shaft 67 by means of a hub 68 and bolts 69 and is spaced from platen 56 as indicated at 70. The shaft 67 is rotatably journaled in bearings 71 and 72 secured by means of bolts 73 to a cross-head or slide-plate 74. The said cross-head 74 is adapted to slide toward or away from the platen 56 on dove-tails 75 which are guided in ways indicated at 76 formed by beveled blocks 77 fastened to the base 51 by bolts 78.

Figure 15:
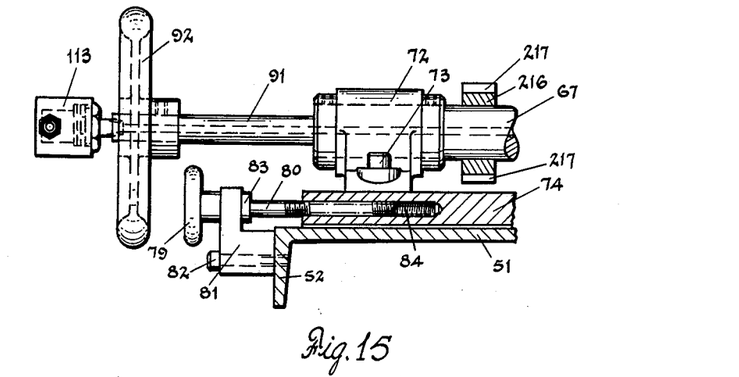
FIG. 15 is a detailed side view of an adjusting device for the vacuum platens taken substantially along lines 15—15 of FIG. 14.

Movement of the cross-head or slide-plate 74 may be accomplished by means of an adjustment knob 79 (FIGS. 13 and 15) having a threaded shaft 80 journaled in an L-shaped bracket support 81. The said bracket 81 is attached by means of bolts 82 to the flanged side portions 52 of the base 51. Shaft 80 is restrained from axial movement relative to the bracket 81 by a stop collar 83 and at its outer end engages a mating drilled and tapped hole 84 in the slide plate 74. Thus, if it is desired to vary the spacing or the distance between the vacuum platens 56 and 57, it is only necessary to turn the knob 79 thereby causing the threaded shaft 80 to slide the cross-head or slide-plate on the base 51 and between the guide blocks 77.

It is important that the glass engaging surfaces of the platens be maintained in parallel vertical planes in order that optimum optical quality may be produced in the finished article. It is also important that proper spacing be obtained between the platen. For this purpose there is provided a stop-arm 85 (FIG. 13) which is mounted by a rivet or the like 86 on bracket 87 secured to the cross-head 74. A stop-screw 88 is threaded through a tapped hole in the outer end of the arm 85 and is adapted to engage a stop-block 89 carried on the beveled block 77. Thus, when the stop-screw 88 engages the block 89, movement of the slide-plate 74 and platen 57 towards the platen 56 will be stopped so that the proper spacing of the platens may be obtained. This spacing may of course be changed by simply releasing the lock-nut 90 on the set-screw to allow the screw to be moved to vary the spacing between the platens. By so adjusting the set-screw 88 and the platens 56 and 57, the air space between the respective sheets 31 and 32 may be varied according to the amount of insulating air space desired.

Extending outwardly from the shaft 67 (FIG. 13) adjacent the bearing 72 is a handle shaft 91 (FIG. 15) of smaller diameter than the central support shaft 67. A handle 92 is secured to the outer end of the shaft 91 and may be turned to rotate the platen 57. In other words, by rotating the handle 92, the shaft 67 and the platen 57 attached thereto may be rotated to sequentially bring the respective edge portions of the sheets of glass 31 and 32 into position to be sealed together as will be more fully described hereinbelow.

As will best be seen in FIGS. 7 and 9, each of the platens 56 and 57 comprises generally a back wall 93 and a face portion 94 which is machined to an extremely smooth finish so that it may evenly and accurately engage a glass sheet to provide an air-tight seal therebetween and also to insure that the two sheets are parallel. Adacent each corner of the respective platens are concave depressions or vacuum cups 95 through which a vacuum may be applied to the sheets to hold them firmly against the platen face portions 94. Grooves 96 along the face of each of the platens connect the said vacuum cups 95 to a centrally disposed circular opening 97 provided in the platen. The opening 97 in the platen 56 mates with a vacuum line 98 bored in the stub shaft 59, while opening 97 in the platen 57 mates with a vacuum line 99 bored in shaft 67.

A vacuum or negative pressure area is created in the vacuum cups 95 of the platens 56 and 57 by means of a vacuum pump 100 (FIG. 14). The said vacuum pump is supported on the carriage 42 above the base 51 by framework which includes pairs of vertical angle iron uprights 101 and 102 fastened to the inverted channel members 66 on the carriage base 51. The uprights 101 on the side of the carriage nearest the furnace 37 are relatively longer than the uprights 102 and have a metal heat shield 103 fastened thereto to protect the vacuum pump from heat effects from the furnace. Horizontally disposed longitudinal angle iron braces 104 are secured to and extend between each pair of uprights 101 and 102 respectively at the level of the shorter uprights 102; and transverse horizontal angle iron braces 105 (FIG. 8) connect each of the uprights 101 and 102 together to thus form an outline frame on which there is secured a mounting plate 106 which affords a support base for the said vacuum pump.

Vacuum pump 100 is connected by a suitable pipe connection to the bore 98 in the stub shaft 59 and also to the bore 99 in the shaft 67 so as to create the desired negative pressure area along the vacuum platen faces. More particularly, a main line 107 extends from the said vacuum pump 100 through a master valve 108 to a T fitting 109. Connected to one outlet of the T-fitting is a branch pipe 110 which passes to the bore 98 in the stub shaft 59 and is connected thereto by a suitable rotary air seal connection 111. A similar branch pipe 112 extends from another outlet of the T and is connected to bore 99 in handle shaft 91 and shaft 67 by a rotary air-seal connection 113. Valves 114 may be provided in each of the lines 110 and 112 if desired to equalize and control the vacuum to the respective platens 56 and 57. Power may be supplied to the vacuum pump 100 by a cable reel or third-rail device (not shown) connected throng an electrical conduct 115 and switch 116 to the said pump.

As mentioned above, the carriage 42 rides on the rails 43 to carry the sheets 31 and 32 through the furnace. Movement thereof is preferably accomplished by means of a chain-drive mechanism which includes a link or sprocket chain 117 trained about a drive sprocket wheel 118 (FIG. 5) journaled adjacent one end of the rail support frame 41, and an idler sprocket wheel 119 journaled at the other end of said frame.

Carriage 42 may be operably connected to the chain 117 by means of a coupling 120 (FIGS. 13 and 14) which comprises a substantially U-shaped bracket 121, suitably secured to one of the inverted channels 66, having pivotally mounted therein a cam 122 and a latch 123 with fingers 124. The latch fingers 124 have a notched cut-out portion 125 therebetween as will best be seen in FIG. 8 so that the said fingers may straddle the chain 117 and engage lugs 126 on both sides of said chain (FIG. 14). To disengage the carriage 42 from the chain, the cam 122 is pivoted downwardly in a clockwise direction about its pivot pin 127 by lever 128 secured thereto. This movement of the cam 122 releases pressure on the upper portion of the latch 123 thus allowing spring 129 connected between a peg 130 on the bracket 121 and a tab 131 on said latch to pivot the latch fingers 124 upwardly in a counterclockwise direction about the pivot pin 124'. This upward movement of the latch thus moves the fingers out of engagement with the lugs 126 and allows the cart to remain stationary while the chain may continue to move.

The drive chain 117 may be driven by any of the well known variable speed drive mechanisms, and for purposes of illustration in this instance is shown to be driven by a conventional variable speed drive motor 132 (FIG. 5). To provide connection between the said drive motor 132 and the drive chain 117, there is provided a sprocket chain 133 trained over drive wheel 134 on the motor 132 and also over a larger sprocket 135 carried on an axle 136 mounted between the upright channels 45 at the end of support frame 41. A second and smaller sprocket wheel 137 is also mounted on the axle 136 and has a chain 138 trained therearound which is also trained around a sprocket wheel 139 mounted with the chain drive sprocket wheel 118. Thus, by the drive arrangement provided, the drive chain may be moved at various speeds depending on the speed at which it is desired to seal the glass sheets 31 and 32 as they are moved through the furnace 37.

Figures 8, 10:
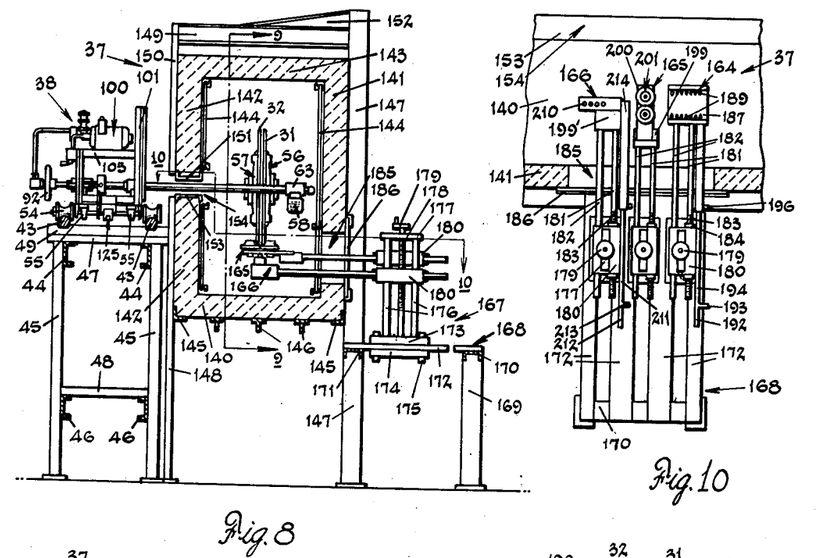
FIG. 8 is a sectional view of the apparatus taken substantially along lines 8—8 of FIG. 6.
FIG. 10 is a sectional view showing a plan view of the burners and forming or shaping tool of the invention taken substantially along line 10—10 of FIG. 8.

Dealing now specifically with the furnace 37, FIG. 8, it is formed generally of a bottom wall 140, side walls 141 and 142 and a roof or ceiling 143 of fire brick or other suitable refractory material; for purposes of illustration, heat is supplied to the furnace by nichrome or other wire filaments 144 fastened to the said side walls 141 and 142, however, gas burners or other well known heating techniques may be employed to produce the desired heating effects. The bottom wall 140 is supported on its corner edges by longitudinally extending angle beams 145, and along its mid-portion by longitudinally extending T beams 146 which are secured to horizontally disposed cross beams (not shown) fastened to support legs 147 and 148. Mounted adjacent the upper end of the legs 147 are horizontally disposed transverse "I" beams 149 which in turn have secured at one end thereof a vertical depending member 150. A longitudinally extending horizontal channel 151 is fixedly attached adjacent the lower end of the members 150 and together with "I" beams 149 and the vertical members 147 supports the upper portion of the side wall 142 in cantilever fashion as will best be seen in FIG. 8. Gusset plates 152 are secured to the upper ends of the legs 147 and to "I" beams 149 to add additional rigidity to said "I" beams.

Spaced below and in parallel relation to the channel 151 is a second channel 153 which holds the lower portion of the side wall 142 in place. The two channels 151 and 153 thus define a slot 154 therebetween which extends the entire length of the furnace and allows the support rods 64 and shaft 67 on the carriage 42 to extend inwardly into the furnace to place the platens 56 and 57 within the confines thereof as will be seen in FIG. 8. Accordingly, it will be apparent that by virtue of the slot 154 in the furnace wall 142, the platens 56 and 57 may be moved from the loading station 39 outside the furnace 37 along a predetermined path of movement in their vertically disposed position into the furnace past each of the sealing stations A, B, C and D and then out of the furnace without meeting any obstructions.

As will best be seen in FIG. 5, at the loading station 39 there is provided a loading device 155 which includes a hydraulic cylinder base 156 having a piston rod 157 operating therein. Carried on the upper end of piston rod 157 is a rack 158 comprising a horizontal base 159 and two pairs of vertically extending support arms 160 having guide fingers 161 adjacent the upper ends thereof. The rack 158 is adapted to be moved upwardly and downwardly by means of hydraulic pressure supplied to the cylinder 156 by pressure lines 162. When in its upward position, the rack is adapted to straddle the platens 56 and 57 so as to properly position the glass sheets 31 and 32 between the said platens. After the sheets have been so positioned, vacuum is applied to the platens and the sheets to bring them into supporting contact with the said platens after which, the rack 158 is lowered thus making it possible for the platens to carry the sheets into the furnace past each of the respective sealing stations A, B, C and D.

Before the sheets are moved to the first sealing station A, they pass through a preheat area 163 to bring the sheets to the proper preheat temperature which is preferably below the annealing temperature of the glass and above the "strain" point of the glass so that the sheets will not crack readily when their edge portions are subjected to intense localized heat.

At each of the sealing stations A, B, C and D along the predetermined path of movement of the glass sheets there are provided sealing elements which include a bending or fusion burner 164 spaced laterally from the path of the sheet (FIGS. 8, 9 and 10), a forming or shaping tool 165 disposed within the path of movement of the lowermost edges of the sheets 31 and 32 and a finishing burner 166. The said sealing elements are mounted by means of similar adjusting means 167 on a frame 168 adjacent the furnace 37 which frame is formed of vertical legs 169 connected by longitudinally extending channels 170, and similar longitudinal channels 171 secured between the furnace support legs 147. Spaced horizontal cross plates 172 extend between the channels 170 and 171 and provide a support on which the adjusting means 167 may be slidably mounted.

More particularly, the adjusting means 167 comprises a base 173 which is slidable on and bridges the space between two adjacent cross-plates 172. The base member 173 is adjustably held in place on the cross-plates 172 by a clamp plate 174 held in engagement with the underside of the said cross plates 172 by bolts or the like 175 which pass through suitably threaded holes in the base member 173. Vertically disposed rods 176 are carried by the base member 173 and have a tie plate 177 mounted on their upper ends. A jack screw 178 having a crank-wheel 179 on its upper end is suitably journaled in the plate 177 and the base member 173 and threadably engages slide blocks 180 which are slidably carried by the rods 176. Thus, by turning the crank-wheel 179, the jack screw may be rotated to move the slide blocks upwardly or downwardly along the said rods.

Each of the slide blocks 180 has extending therethrough support rods 181 and 182, which as individual pairs are adapted to carry the respective fusion burners 164, forming tools 165 and finishing burners 166 as will be described hereinbelow. The support rods 181 are threaded as at 183 and engage a threaded sleeve 184 carried in each of the said slide blocks 180, while the support rod 182 is machined and is slidably mounted therein. By turning the sleeve 184, the threaded rod 181 may be moved inwardly or outwardly in the block thus causing the rod 182 to slide in the said block and moving the respective sealing element carried thereby horizontally within the furnace.

As can be seen in FIG. 8, the support rods 181 and 182 at each sealing station extend through an opening 185 provided in the side of the furnace which may be covered by a sealing gland 186 of asbestos or other suitable material so as to restrict or reduce the heat loss from the furnace. In this case, the rods 181 and 182 slidably pass through holes in the gland, which is preferably slidable so that it will afford an adequate seal as the rods are moved vertically by their respective adjustment means 167 to adjust the respective sealing element carried thereby. It will thus be apparent that the individual elements at each of the sealing stations may be moved vertically toward or away from the path of the sheets 31 and 32 by means of the respective jack screws 178, and in a horizontal direction by the threaded sleeves 181, which may be used for fine adjustment, and also by releasing the clamping plates 174 and sliding the base members 173 along the cross plates 172.

Turning now to the construction of the fusing burner heads 164, and with reference to FIGS. 10 and 11, it will be noted that the said burner heads include a substantially rectangular base plate 187 which is secured to a pair of the support rods 181 and 182. Mounted along two opposed edges of said base plate 187 are manifolds 188 each of which has a row of angularly disposed nozzles 189 threadably secured therein in tapped holes 190. The nozzles 189 serve to direct flames 191 in proper impinging relation upon the edge portions of the glass sheets 31 and 32 as they move therepast to heat the said edge portions to the necessary temperature.

Intense localized heat for sealing the said edge portions of the glass sheets may be supplied by the flames 191 from an oxygen and natural gas mixture or other suitable mixtures. For this purpose, the oxygen and gas for each of the burner heads is supplied from a suitable source (not shown) through pipes 192 and 193 respectively which connect to an inlet pipe 194 wherein they are combined and mixed. The inlet pipe 194 is in turn connected to the burner head 164 through a substantially short vertical pipe 195 provided alongside each of the manifolds 188 (FIG. 11). The short vertical pipes 195 connect into distribution passageways (not shown) which extend horizontally within and along the length of the manifolds and intersect each of the passageways formed by the tapped holes 190 leading to the nozzles 189. Thus by using the oxygen-gas fuel and the arrangement of nozzles just described, an intense flame may be directed to the peripheral edge portions of the glass sheets to heat them to substantially the fusing temperature of the glass.

If desired, a coolant to cool the gas mixture below its combustion temperature may be supplied from a suitable source (not shown) through pipes 196 connected to a jacket 197 surrounding the said inlet pipe 194 (FIG. 11). This coolant may be circulated in the passageway indicated at 198 between the inlet pipe 194 and the jacket 197 by means of a suitable pump not shown.

After the pair of aligned lowermost edge portions of the glass sheets are heated to the proper temperature by the impinging flames 191 coming from the nozzles 189, these edge portions are moved into contact with the forming tool 165 which is disposed in the path of travel of the sheets. As will best be seen in FIGS. 8 and 10, and as described above, the forming or shaping tools are mounted on an adjusting means 167 similar to the adjusting means for the fusion burner 165.

As best shown in FIGS. 10 and 12, the forming tool 165 is preferably carried on a notched block 199 secured to the ends of a pair of rods 181 and 182. More particularly, the said forming tool includes a plate 200 carried by the block 199 having forming wheels 201 mounted thereon. Forming wheels 201 are rotatably mounted on substantially vertical axles 202 which have a flanged bearing disc 203 and a threaded portion 204 thereon and have their innermost adjacent portions spaced from one another a distance less than the distance between the outermost surfaces of the glass sheets. The threaded portions 204 of the axles pass through adjustment slots 205 in the plate 200 and may be moved in the slots by loosening the nuts 206 and washers 207. In this manner, by moving the forming wheels toward or away from one another, the shape and type of edge seal may be varied, within limits, without changing the configuration of the forming wheels as will be described hereinbelow.

With particular reference now to the design of the forming wheels 201, each of the wheels preferably has a lower cylindrical ridge portion 208 which may be moved into substantial contact with the other as shown in FIG. 12, while the upper portions of the forming wheels are tapered upwardly and inwardly from the said ridge portion 208 and have a dished-out or concave effect as indicated at 209. This dished-out or concave effect 209 is formed to correspond to the desired curvature or shape of the sealed edge or side wall 34 of the multiple sheet glazing unit 30, and the portions 209 of the wheels 201, in combination, form a contoured opening having a maximum width equal to or slightly greater than the distance between the outermost surfaces of the pair of sheets and a minimum width less than the thickness of the two sheets.

Figure 17:
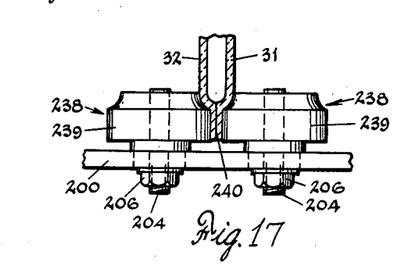
FIG. 17 shows another embodiment of the shaping or forming tool which is adapted to produce the edge wall configuration shown in FIG. 4.
Figure 18:
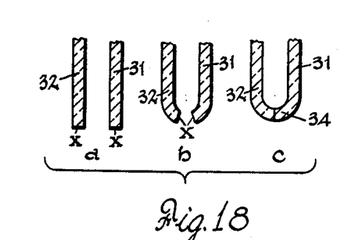
FIG. 18 illustrates the manner in which spaced sheets of glass are sealed together along their edges by the shaping tool shown in FIG. 12.

As the sheets leave the fusion burner area where the edge portions thereof are heated to at least the bending temperature of the glass, they, in the preferred embodiment, are engaged by the forming wheels 201 which are free to rotate with the relative movement of the sheets and act to force, press or bring the edges x of the respective sheets 31 and 32 into contact with one another as is illustrated in FIG. 18. Thus, the softened edge portions of the sheets upon striking the restricted passageway between the forming wheels are caused to deflect inwardly while at the same time the edges x—x are moved or turned upwardly to be brought into abutting contact with one another as is shown in FIG. 18. In effect therefore, as a result of the concave portions 209 and ridge portions 208 of the forming wheels the heated marginal portions of the sheets are pressed inwardly while the edges x—x are pushed upwardly and turned into abutting contact with one another. Of course, various other shapes may be imparted to the edge or side walls of the all-glass glazing unit by other types of forming wheels (not shown) after they have been sealed according to one of the methods illustrated in FIGS. 12 and 16 through 19 inclusive.

If desired, after the side walls or edges 34 of the all-glass unit have been bent to the desired configuration by the forming tool 165, the marks or scratches that may have been formed by the said forming tool may be removed by a fire polishing process. For this purpose there is provided a finishing burner 166 mounted in substantial alignment with the fusion burner 164 and the forming tool 165.

The said finishing burner 166 is mounted on an adjusting means 167 similar to that used for the fusion burner 164 and the forming tool 165. More particularly, the finishing burner 166 is supported on the ends of support rods 181 and 182 by a cross plate 209' which bridges the ends of the said rods as will be seen in FIG. 10. The finishing burner is substantially rectangular in shape and has a row of nozzles 210 extending along the upper longitudinal dimension thereof. A mixture of oxygen and natural gas is supplied to the finishing burner head by an inlet pipe 211 which is connected to an oxygen supply pipe 212 and a fuel-gas supply pipe 213. Inlet pipe 211 may be cooled by a coolant circulated in a jacket 214 surrounding the portion of the inlet pipe extending into the furnace proper. This jacket may be similar to the cooling jacket 197 shown in FIG. 11 and discussed in connection with the fusion burners 164. As before, a short vertical pipe 215 connects the inlet pipe 211 with a distribution passageway (not shown) within the finishing burner 166.

From the foregoing, it will be apparent that only one edge wall of the multiple sheet glazing unit 30 is sealed at a time, and after one edge has been sealed for example at sealing station A, it is necessary for the unit to be rotated 90° in the case of rectangular units to place another pair of unsealed edges in position to be sealed as the carriage 42 moves them to sealing station B. For the purpose of rotating the glazing unit, the crank handle 92 on the end of handle shaft 91 is used to rotate the shaft 67 and the platen 57. Since at this point the sheets 31 and 32 are joined along one edge thereof and since both of the platens 56 and 57 exert vacuum forces upon the glazing unit, the far platen 56 may also rotate in its bearing mount 60 with the glazing unit 30 when platen 57 is rotated.

In rotating the glazing unit after one edge has been sealed, it is important that the unit be rotated exactly 90° to place the next edge to be sealed in exact alignment with the fusion burners 164 and the forming tool 165. This is accomplished by means of an indexing head 216 (FIGS. 13, 14 and 15) mounted on the shaft 67. Slidably mounted in a guide bracket 218 and adapted to engage one of the respective notches 217 in the indexing head 216 to prevent rotation of shaft 67 is an indexing finger 219. The said finger 219 is held in engagement with the notches by a suitable spring (not shown) and is moved out of engagement therewith by an actuating lever 220 pivotally mounted in a U-shaped bracket 221 by means of a pin 222. The lever 220 has a slotted end portion 223 which passes through a slot 224 in the end of the indexing finger 219 and is held therein by a pin 225. Thus, as the actuating lever 220 is moved toward the grip handle 226 mounted on the U-shaped bracket 221, the pin 225 is engaged by the slotted end portion 223 and the indexing finger 219 is moved out of engagement with the said notch 217 allowing the shaft 67 and platen 57 to be rotated.

After the carriage 42 moves the glazing unit through the respective sealing areas A, B, C and D, it passes through an annealing zone 227 where the sheets are slowly cooled and the carriage is stopped by a suitable control circuit at an unloading station indicated generally at 40. Positioned directly below the platens 56 and 57 at this station is an unloading device 228 similar in design to the loading device 155. More particularly, the unloading device comprises a cylinder base 229 having a piston rod 230 therein. Secured to the top portion of the piston rod is a rack 231 having a base member 232 and two pair of spaced vertically extending support arms 233. The rack is moved upwardly by means of a hydraulic pressure supplied to the cylinder by pipes 234 to a point where the support arms 233 straddle the sealed glazing unit 30. When the rack is in its up position, the vacuum is released from the platens 56 and 57 and the glazing unit 30 is allowed to settle upon the rack base member 232 after which, the hydraulic pressure is released and rack 232 is lowered to allow the platens to be moved out of the furnace through a suitable opening (not shown) by means of the carriage 42. The finished glazing units may then be further annealed by moving them through a suitable lehr (not shown) by any of the well known types of conveyor mechanisms.

Upon completing a sealing cycle, the carriage 42 may then be disconnected from the drive chain 117 and carried back to the loading station 39 by means of a crane 235 which is schematically shown in FIG. 5. Of course, other suitable means such as elevators etc., may also be used to return the carriages to the front of the furnace to begin another cycle of operation.

Reviewing now the entire process of this invention by which spaced vertically disposed sheets of glass may be sealed around their periphery to produce the hermetically sealed glazing unit 30, initially the sheets of glass 31 and 32 are positioned at loading station 39 in a loading device 155. Platens 56 and 57 of the carriage 42 are then positioned above the loading device 155 and the sheets are moved upwardly between the said platens so that the non-facing or non-opposed outermost surfaces of the sheets are in proper position to be engaged and supported by the platens. With the sheets so supported, a vacuum is applied to the sheets through the platens 56 and 57 which thus firmly engage and support the sheets in vertical, spaced face-to-face relationship with one another and in such a fashion that the spacing between any given pair of opposed points on the facing surfaces of the sheet is substantially constant and fixed. By supporting the sheet in this fashion, the area or space therebetween is exposed to the atmosphere about substantially the entire periphery of the sheets and also, as was previously pointed out, no spacers or other supports are necessary to maintain the sheets in proper relationship with one another during the fusing together of the edges.

After the sheets are supported by the platens the loading device is then lowered and the carriage moves the platens 56 and 57 holding the spaced sheets 31 and 32 into the furnace 37 through a door or suitable opening, not shown.

After entering the furnace the sheets move along a predetermined path and while moving along the initial portion of this path immediately after entering the furnace, the sheets are substantially uniformly heated over their entire area to bring them to the desired preheat temperature. This temperature preferably is a temperature slightly less than the annealing temperature of the glass which for most suitable glass compositions is about 1000° F., or just above the "strain" point.

After preheating of the sheets has taken place they are moved into the first sealing area A, and while still moving along the predetermined path, the lowermost edge portions of the pair of sheets are progressively heated by the flames 191 as they move past the nozzles 189. While being subjected to these flames the sheet edge portions become heated to at least the softening temperature of the glass or the temperature at which they may be properly fused to one another to form a hermetically sealed unit.

Immediately after a given pair of opposed sheet edge portions pass the fusion burner head 164 and while said edge portions are at fusing temperature they are moved into engagement with forming tool 165 which is positioned in vertical alignment with the pair of sheets and within the path of movement of the lowermost edges thereof. As previously brought out the spacing and configuration of the forming wheel 201 is such that the heated marginal sheet edges are simultaneously pressed inwardly and upwardly toward one another until the edges abut one another and are fused together. When initially engaged by the wheel 201, the heated edge portions of the sheet are contacted first at the corner formed by the outermost surface and the edge x. As the sheets move further along the path the wheel progresses upwardly and rearwardly along the outermost sheet surface. This manner of forming the glass edge portions is advantageous in that a substantial component of the forming or pressing force exerted by the wheel 201 is directed in the plane of each sheet and also against the direction of movement of the sheet. Thus, the resistance of the sheet coupled with the momentum thereof causes the sheet portions being engaged to accurately conform to the configuration of the forming wheel. Also, the fact that the force applied to each sheet is exerted primarily by the concave surface 209 causes the engaged sheet portions to be simultaneously lifted upwardly and inwardly thus rapidly forming the sheet to the desired configuration while the edge portions remain substantially at fusion temperature.

Briefly stated therefore the improved product of the present invention results from a progressively upwardly and inwardly pressing or lifting of the heated lowermost marginal edges of the glass sheet while they are supported in vertical, substantially parallel spaced relationship with one another and with the space between the sheet being substantially constant between any pair of opposed points on the facing surface thereof. The improved product is also believed to result due to fact that the heated sheet portions are simultaneously pressed toward and into contact with one another.

From the forming tool the sheets pass the finishing burner 166 which heats the sealed edge portions to remove surface irregularities imparted to the sealed edge by the forming wheels 201.

Before moving to the second sealing area B, the sheets are rotated 90° in the plane of the sheets by means of the crank handle 92 which rotates the shaft 67 and platen 57 to place another pair of aligned edges of the sheets 31 32 in position to be sealed in the manner noted above. After passing the sealing area B the remaining two edge areas of the sheets will be successively sealed in the same manner as they pass the sealing areas C and D. In other words, the glazing unit will again be rotated before the sheets pass to the sealing area C to be sealed, and also before the unit passes to the sealing area D to complete the sealing operation. Thus, it will be apparent that as the sheets 31 and 32 are moved through the respective sealing areas that they will be sealed entirely around their peripheral edge portions to form the before mentioned enclosed space 33.

As mentioned previously, a dehydration hole 35 is disposed toward one corner of the glass sheets. This hole serves as a "breather" permitting the air enclosed in the space 33 to adjust itself to room temperature after removal from furnace 37 whereupon, the space 33 may be dehydrated and the hole 35 hermetically sealed by any of the well known methods to seal off said space in its dehydrated condition.

While the preferred process of forming the all-glass glazing unit has been described above, various modifications of the process and apparatus may be practiced.

Figure 16:
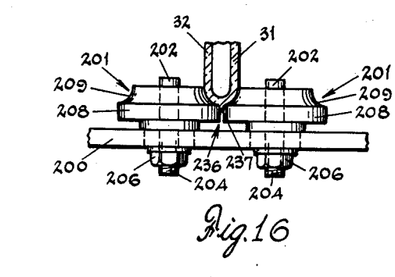
FIG. 16 shows an alternate embodiment of the shaping tool shown in FIG. 12 which is adapted to produce the side wall having a cross section as shown in FIG. 3.

For instance, other embodiments of the forming tool 165 may be used to form variously shaped edges suitable for different types of installation fixtures. For example, as shown in FIG. 16, if a centralized projection is desired along the fused sidewall of the glazing unit, forming wheels 201 may be spaced as indicated at 236 so that as the heated edges $x$ of the glass sheets 31 and 32 are pressed into fusing contact with one another, a small projection 237 which may extend around the entire periphery of the unit will be formed between the ridge portions 208 of the wheels. An edge cross section of the glazing unit so produced is clearly shown in FIG. 3.

Figure 19:
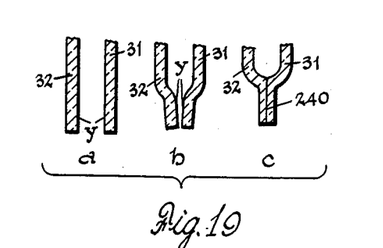
FIG. 19 illustrates the manner in which spaced sheets of glass are fused together along their edge portions in face-to-face contact with one another by the forming tool shown in FIG. 17.

Alternatively, a further embodiment of the forming tool is shown in FIG. 17 which may be used to seal the marginal face areas or portions $y$ of the sheets in face-to-face contact with one another. In this instance, forming wheels 238 are spaced apart from one another to allow the lower portion of the sheets 31 and 32 to pass between the cylindrical portions 239 thereof so as to form a centralized flange 240 around the entire unit as shown in FIG. 19. In passing between the forming wheels 238, the face areas $y$ of the edge portions of the sheets will be progressively shaped or brought towards one another until they meet as is clearly illustrated by the schematic diagrams of FIG. 19. Of course, by varying the shape of the forming wheels, different shapes may be imparted to the sealed edges to suit the desired use. In this connection, it will be evident that a single forming wheel instead of two forming wheels may also be used to produce the desired shaping effect.

Also, while the sheets have been shown to be heated to substantially the fusion temperature of the glass before they are shaped by the forming wheels, it is evident that they may be heated to the bending temperature and then heated to the fusion temperature after or while they are being shaped. Moreover, the fusion burner and the forming tools may be moved while the edges of the sheets are held in a stationary position, or, both the sheets and the sealing elements may be moved relative to one another. Additionally, it will also be apparent that means may be provided to rotate the back platen 56 independently of or instead of platen 57 to produce the desired rotation of the sheets 31 and 32.

It will of course also be understood that the form of the invention disclosed herein is to be taken as the preferred embodiment thereof, and that various changes in the shape, size and arrangement of parts may be resorted to without departing from the spirit of the invention or the scope of the following claims.

We claim:

1. The method of sealing an edge of a multiple sheet glazing unit, which comprises supporting rigid glass sheets in a substantially vertical fixed and uniformly spaced face-to-face relation with respect to one another, heating the edge portions of the spaced glass sheets progressively from one end of the sheets to the opposite end thereof to render them pliable, and deflecting the spaced heated edge portions of said sheets toward and into fusion contact with one another also progressively from one end of the sheets to the opposite end thereof to form an edge wall.

2. The method of sealing an edge of a multiple sheet glazing unit, which comprises supporting rigid glass sheets in vertical spaced face-to-face relation, directing heat from a concentrated heat source onto the marginal edge portions of the glass sheets to raise the temperature of the glass to the softening point, moving the glass sheets and the heat source relative to and past one another to heat said marginal edge portions progressively from one end of the sheets to the opposite end thereof, and deflecting the heated marginal edge portions of the glass sheets toward and into fusion contact with one another during such relative movement of said sheets and said heat source past one another to form an edge wall.

3. In a method of producing multiple sheet glazing units, the steps of supporting a pair of glass sheets in substantially vertical fixed and uniformly spaced face-to-face relation with respect to one another, heating the bottom edge portions of the sheets to bending temperature, deflecting said heated edge portions upwardly and inwardly into direct fusion contact with one another to form a sealed edge wall having a rounded inner surface, and then rotating the sheets in the plane of said sheets to bring other edge portions of the said sheets into position for heating and sealing.

4. A method of producing multiple sheet glazing units, comprising supporting a pair of hard glass sheets in substantially vertical fixed and uniformly spaced face-to-face relation with respect to one another, conveying the sheets along a definite substantially horizontal path, heating the bottom edge portions of the sheets during movement thereof along said path progressively from one end of the sheets to the other end, continuing forward movement of the glass sheets, deflecting said heated edge portions upwardly and inwardly into fusion contact with one another progressively from one end of the sheets to the other end during forward movement of said sheets to form a sealed edge wall having a rounded inner surface, and then rotating the sheets about a substantially horizontal axis to bring other edge portions of the sheets into position for heating and sealing.

5. In apparatus for sealing an edge of a multiple sheet glazing unit, supports for maintaining two rigid sheets of glass in substantially vertical fixed spaced face-to-face relation with respect to one another, heating means for raising the temperature of the edge portions of said sheets to the fusion point of the glass, forming means for engaging and deflecting said heated edge portions toward and into fusion contact with one another, and means for effecting relative movement between the heating means, the forming means and the glass sheet supports during the heating and deflecting of the edge portions of the sheets to seal the edge of the unit progressively from one end of the sheets to the other end thereof.

6. In apparatus for sealing an edge of a multiple sheet glazing unit, a carriage, means for mounting said carriage for movement along a definite path, vacuum means mounted on said carriage for supporting sheets of glass in a substantially vertical position and in fixed spaced face-to-face relation to one another, heating means disposed along the path of movement of the carriage for raising the temperature of the edge portions of the sheets to the fusion temperature of the glass, and means mounted in the path of movement of the carriage for engaging the edge portions of the glass sheets and for bringing them into contact with one another to fuse said edge portions together.

7. Apparatus for producing multiple sheet glazing units as defined in claim 6, including means for rotating said vacuum means to rotate the glass sheets carried thereby in a vertical plane to bring unsealed edge portions of the sheets into sealing position.

8. In apparatus for sealing an edge of a multiple sheet glazing unit, means for supporting rigid glass sheets in a vertical fixed spaced face-to-face relation, means for conveying said supporting means and the glass sheets along a definite path, stationary burner means disposed adjacent said path and operable to heat the marginal edge portions of said sheets to a temperature at which they are pliable as said sheets are carried along said path, and means disposed adjacent said heating means and operable to engage the outer surfaces of the heated marginal edge portions of said sheets and to press said edge portions toward and into fusion contact with one another also during movement of the sheets along said definite path.

9. In apparatus according to claim 8, in which the means engaging the edge portions of the glass sheets for pressing them toward and into fusion contact with one another include a pair of forming rollers engaging the outer surfaces of the marginal edge portions of the glass sheets.

References Cited in the file of this patent

UNITED STATES PATENTS

| | | |
|---|---|---|
| 1,448,351 | Kirlin | Mar. 13, 1923 |
| 2,116,297 | Aurien | May 3, 1938 |
| 2,182,986 | Hoge et al. | Dec. 12, 1939 |
| 2,193,393 | Danner | Mar. 12, 1940 |
| 2,334,123 | Perkins | Nov. 9, 1943 |
| 2,398,371 | Gerspacher | Apr. 16, 1946 |

FOREIGN PATENTS

| | | |
|---|---|---|
| 536,858 | Great Britain | May 29, 1941 |